Figure 11:
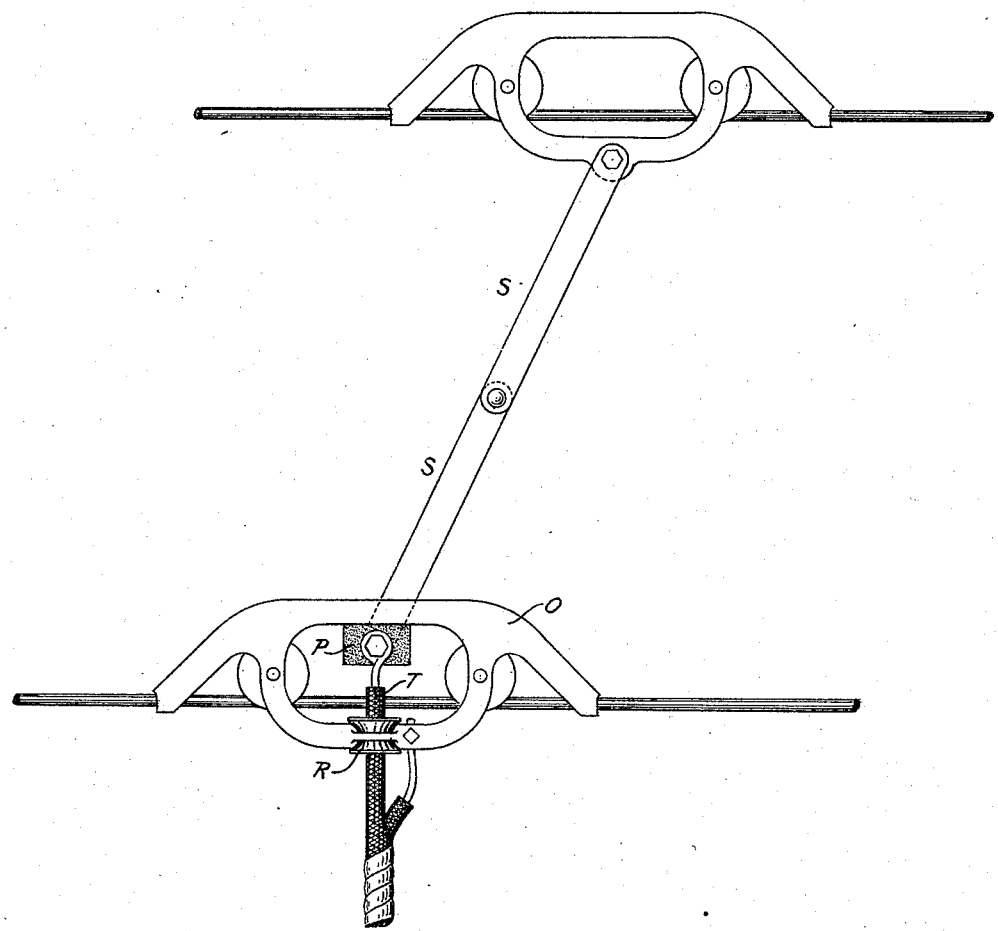

(No Model.) 3 Sheets—Sheet 1.
E. M. BENTLEY.
OVERHEAD CONDUCTOR FOR ELECTRIC RAILWAYS.
No. 469,353. Patented Feb. 23, 1892.
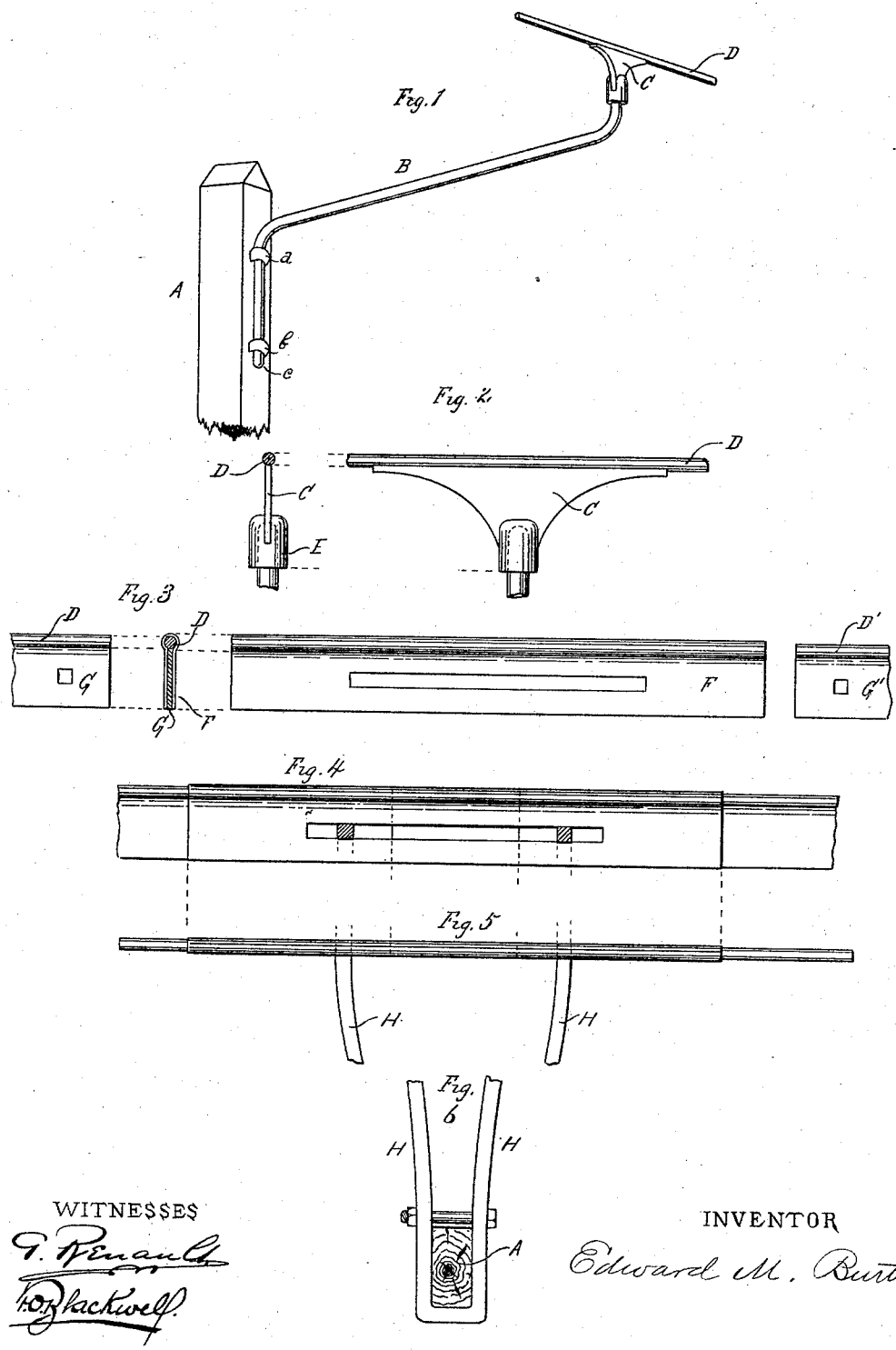
WITNESSES
INVENTOR
Edward M. Bentley

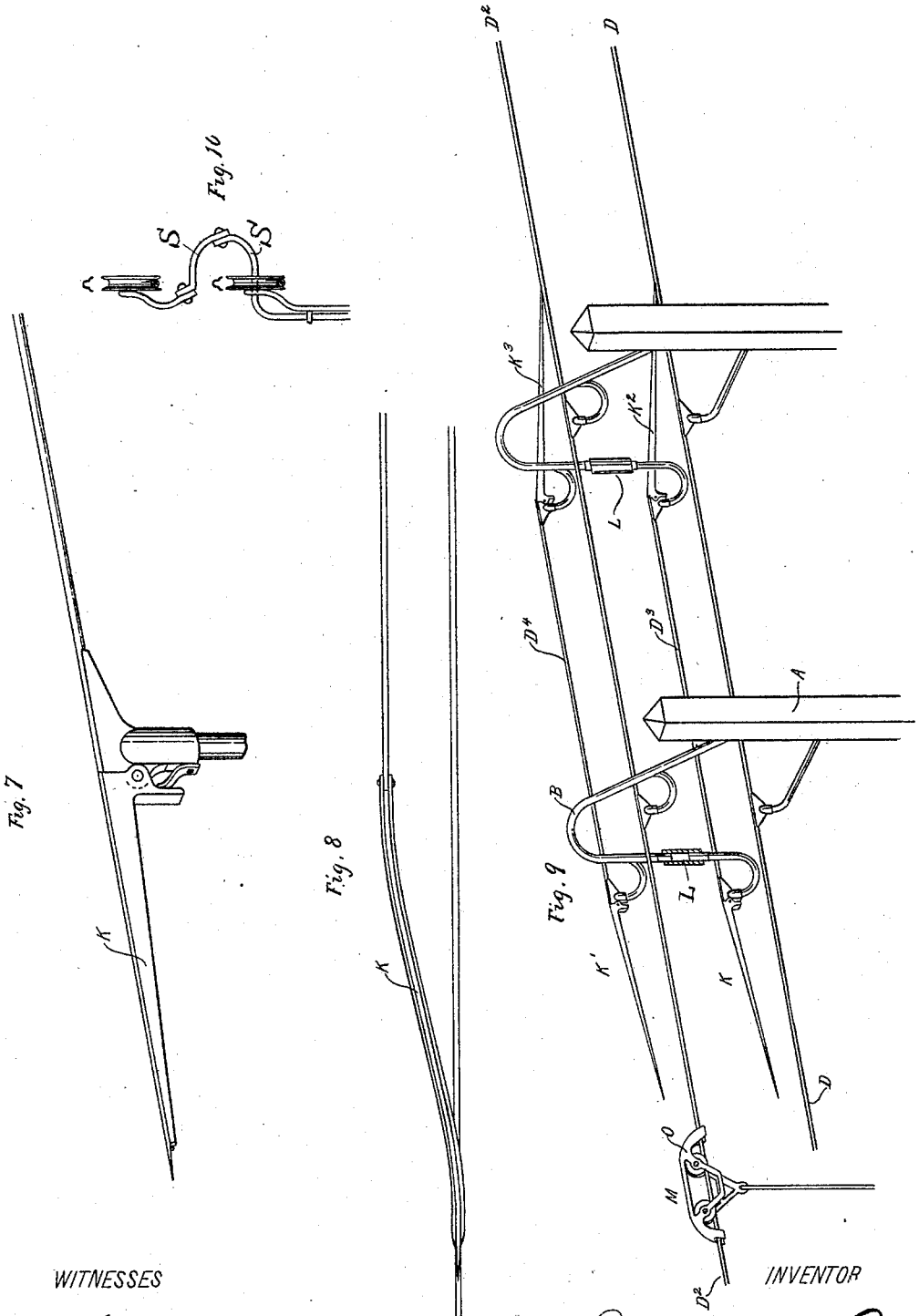

(No Model.) 3 Sheets—Sheet 3.

E. M. BENTLEY.
OVERHEAD CONDUCTOR FOR ELECTRIC RAILWAYS.

No. 469,353. Patented Feb. 23, 1892.

WITNESSES
S. McCauldwell
J. L. Blackwell

INVENTOR
Edward M. Bentley

UNITED STATES PATENT OFFICE.

EDWARD M. BENTLEY, OF NEW YORK, N. Y.

OVERHEAD CONDUCTOR FOR ELECTRIC RAILWAYS.

SPECIFICATION forming part of Letters Patent No. 469,353, dated February 23, 1892.

Application filed September 17, 1887. Serial No. 249,966. (No model.)

*To all whom it may concern:*

Be it known that I, EDWARD M. BENTLEY, a citizen of the United States, residing at New York, in the county of New York, State of New York, have invented certain new and useful Improvements in Overhead Conductors for Electric Railways, of which the following is a specification.

My invention relates to devices for suspending overhead conductors for electric railways, and to switches by means of which the traveling contact devices are enabled to pass between main and branch conductors.

In the accompanying drawings, forming part of this specification, Figure 1 shows a supporting-bracket carrying a fin attached to the suspended conductor. Fig. 2 is a detail view of a fin. Figs. 3, 4, 5, and 6 illustrate my tension device. Figs. 7, 8, and 9 show a turn-out and switch points, and Figs. 10 and 11 illustrate the trolleys for maintaining a traveling contact with the car to be propelled.

In the drawings, A is a post placed beside the railway-track, similar ones being placed at convenient distances along the whole road. In the upper part of this post are set eye-bolts $a$ $b$, in which is dropped one end of an iron or steel bracket-arm B, the lower end resting on a spike $c$. The other end of B is turned up and on it is fitted the thimble or socketed brass fin C, which is soldered or brazed to the main conductor D. The bracket B is free to turn in its bearings $a$ $b$, while the socket of the fin is also free to turn on the bracket. By this means there is avoided the necessity of great exactitude in the positions of the fins on the wire, while any expansion or contraction of the wire is carried past the supporting-post, and strain thereon is avoided.

When it is necessary to take up the sag of the wire due to its varying length under different temperatures, I place at intervals in the length of the conductor the tension device shown in Figs. 3, 4, 5, and 6. To the ends of two adjacent sections of conductor I attach ribs or fins G G', and then insert the two ends in a sleeve F, formed of thin sheet metal shaped to the contour of the conductor and fins. I then insert two spring-arms H through a long slot in F and through holes in the ends of G G', respectively. The tendency of arms H is to draw toward each other and they are of sufficient stiffness to keep the wire constantly under tension. Though the two ends D D' may approach or recede from each other the sleeve F will always form a bridge for the contact device to pass over, the two ends telescoping within it.

Fig. 6 shows the spring-arms H extending horizontally from a post A.

When two conductors are used, I prefer to place them one above the other, each being supported by independent brackets B, the wood of the post forming the insulation between them.

For switching I use the devices shown in Figs. 7, 8, and 9. $D^3$ and $D^4$ are the conductors on the branch or side track. D and $D^2$ are the main conductors. $D^3$ and $D^4$ are supported by a bracket B reaching from post A over the upper main wire $D^2$ and down between the two sets of conductors. The lower end of B, supporting $D^3$, is insulated by a sleeve L. The contact-trolleys M have a car connection extending down on one side of the wire upon which they run, and the described shape of B is to permit the passage of the trolley belonging to the upper main conductor $D^2$ without interference with the bracket. At each end of a branch conductor is a hinged switch-point K, adapted to move vertically and adapted to form a path for the trolleys between the main and branch conductors. At one end these switch-points are held elevated, so that the trolleys may run under them along the main wire, while at the other end they normally rest their points on the main wire, so that the trolleys may run up onto them and along the branch wires. In going out of the switch in one direction the guard O on the trolley comes under the "down" switch-point from behind and lifts it up and after passing out from under it drops it back again in its normal position. When going out in the opposite direction, the trolley runs onto the "up" switch-point, and by its weight depresses it until its point rests on the main wire, and permits the trolley to run down onto it. When the trolley has passed, the spring lifts the point back to its elevated position again. The main wires are on a lower level than the corresponding branch wires.

In running under the elevated switch-points the car connection for the upper trolley must be bent so as not to interfere with the lower switch-point, which is vertically above the lower wire. This curving is shown in Fig. 10, where the connecting-wire for the upper trolley curves first to the lower trolley and then crossing over bends out of the way of the switch-point and continues to the connection with the upper trolley. The trolleys are shown more in detail in Fig. 11.

An insulating-piece P is fastened under the guard O of the lower trolley. The insulated wire T from the car passes up through ring R, and is fastened by a bolt passing through P. To the other end of the bolt is pivoted one of the two flat resilient metal links S, which are pivoted together, as shown, and the upper one pivoted to the upper trolley. These links form part of the circuit from the upper conductor and trolley to the propelling-motor, for they are in electrical connection with the bolt passing through the insulating-piece P, which forms one of the terminals, while the return wire is connected directly with the metal of the lower trolley O, that forming the second terminal. By this arrangement the two trolleys are held from tipping or swaying, although the links are flexible enough to go around curves and they can go in either direction with equal facility.

What I claim as new, and desire to secure by Letters Patent, is—

1. The combination, with a suspended electric conductor, of a supporting-fin to which the conductor is secured and which is itself pivoted on a vertical axis, as set forth.

2. The combination, with a suspended conductor, of a socketed fin to which the conductor is attached and a support entering the socket and permitting movement of the fin relatively thereto.

3. The combination, with the suspended conductor, of a supporting bracket-arm therefor movable on a vertical axis and having a jointed connection with the conductor.

4. The combination, with the suspended conductor, of a supporting bracket-arm movable on a vertical axis, and a fin to which the conductor is attached, pivoted to the outer end of the bracket-arm, likewise on a vertical axis.

5. In an electric railway, the combination, with a contact device traveling in engagement with a supply-conductor, of an expansion-joint between adjacent conductor-sections, consisting of a separate conducting-sheath connecting the ends of the conductor-sections and permitting them to approach and recede from one another without interruption of the contact-surfaces.

6. The combination, with two adjacent ends of conductor-sections movable relatively to each other, of a tension device normally drawing them together and an inclosing-sheath permitting the approach or recession of the two ends without interruption of the contact-surfaces.

7. The combination, with two adjacent ends of conductor-sections movable relatively to each other, of a flange or fin upon each to which a tension device normally drawing them together is attached and a telescoping device allowing the approach or recession of the two ends without interruption of the contact-surfaces.

8. In an electric railway, the combination of two suspended supply-conductors, one above the other, two branch conductors therefor, and an intermediate support for the lower branch conductor extending downward from a point above the upper conductor.

9. The combination, in an electric railway, of two suspended conductors, one above the other, branch conductors therefor, and a common supporting-post for main and branch conductors at the branching point.

10. In an electric railway, the combination of two suspended conductors, one above the other, two corresponding branch conductors, and a support for one of the lower conductors extending down from above the corresponding upper conductor.

11. In an electric railway, the combination of two suspended conductors supported from below, contact devices, each having a connection to the car, extending down beside the conductor upon which it bears, branch conductors adapted to the same contact devices, and a support for one of the lower conductors extending down from above the upper conductor on the side opposite the said connection to the car.

12. In an electric railway, the combination of two conductors, one above the other, a switch-point for the lower conductor movable vertically, and a contact device for the upper conductor having a connection with the car and bent so as to avoid interference with the said switch-point.

13. The combination, with two line conductors, one above the other, of contact-trolleys upon the respective conductors, two links pivoted to the respective trolleys and to each other, and a flexible connection between the lower trolley and the traveling vehicle, as described.

14. The combination of two supply-conductors with a trolley traveling along one of said conductors and connected to a traveling vehicle, a second trolley upon the second conductor, and a conducting-link connecting the two trolleys, which both draws the second trolley and forms part of the circuit between the conductor and the vehicle.

15. The combination of two supply-conductors with two trolleys therefor, a connecting-link whereby one trolley is drawn by the other, two terminals, both located upon one trolley, insulated from each other and in circuit with the two conductors, respectively, and conducting-leads extending from the said terminals to a translating device upon the traveling vehicle.

16. A suspended electric conductor having interposed therein a spring acting to tighten the conductor, for the purpose described.

EDWARD M. BENTLEY.

Witnesses:
JULIEN M. ELLIOT,
JOS. S. BLACKWELL.